United States Patent
Xu et al.

(10) Patent No.: US 6,652,192 B1
(45) Date of Patent: Nov. 25, 2003

(54) HEAVE SUPPRESSED OFFSHORE DRILLING AND PRODUCTION PLATFORM AND METHOD OF INSTALLATION

(75) Inventors: Qi Xu, Katy, TX (US); Phillip A. Abbott, Katy, TX (US); John Halkyard, Houston, TX (US)

(73) Assignee: CSO Aker Maritime, Inc., Houston, TX (US)

( * ) Notice: Subject to any disclaimer, the term of this patent is extended or adjusted under 35 U.S.C. 154(b) by 0 days.

(21) Appl. No.: 09/686,535

(22) Filed: Oct. 10, 2000

(51) Int. Cl.[7] .............................................. E02D 29/00
(52) U.S. Cl. ................... 405/195.1; 405/203; 405/207; 405/223.1; 405/224; 114/264; 114/265
(58) Field of Search ...................... 405/195.1, 196–200, 405/203, 205, 207, 208, 210, 223.1, 224, 224.1, 224.4; 114/264, 265; 166/350, 359, 367, 368; 175/5–7

(56) References Cited

U.S. PATENT DOCUMENTS

| | | | |
|---|---|---|---|
| 3,397,545 A | | 8/1968 | Leavitt |
| 3,797,438 A | | 3/1974 | Fayren |
| 3,982,492 A | * | 9/1976 | Steddum ...................... 405/265 |
| 3,986,471 A | | 10/1976 | Haselton |
| 3,996,754 A | * | 12/1976 | Lowery ....................... 405/197 |
| 3,996,755 A | * | 12/1976 | Kalinowski ................. 405/203 |
| 4,062,313 A | | 12/1977 | Stram |
| 4,212,561 A | | 7/1980 | Wipkink |
| 4,227,831 A | * | 10/1980 | Evans ......................... 405/196 |
| 4,266,496 A | | 5/1981 | Carlsen |
| 4,266,887 A | * | 5/1981 | Corder ........................ 405/196 |
| 4,329,088 A | | 5/1982 | Lucas |
| 4,453,859 A | | 6/1984 | Sédillot et al. |
| 4,455,108 A | | 6/1984 | Lausberg |
| 4,468,157 A | | 8/1984 | Horton |
| 4,823,719 A | | 4/1989 | Sarwe |
| 4,907,912 A | * | 3/1990 | Smith ......................... 405/208 |
| 5,609,442 A | | 3/1997 | Horton |
| 5,722,797 A | | 3/1998 | Horton, III |
| 6,024,040 A | | 2/2000 | Thomas |
| 6,092,483 A | | 7/2000 | Allen et al. |
| 6,196,767 B1 | * | 3/2001 | Thomas ....................... 405/203 |

FOREIGN PATENT DOCUMENTS

| | | | | |
|---|---|---|---|---|
| GB | 2079826 | * | 1/1982 | ................. 405/207 |
| GB | 2081782 | * | 2/1982 | ................. 405/205 |

* cited by examiner

*Primary Examiner*—Heather Shackelford
*Assistant Examiner*—Jong-Suk Lee
(74) *Attorney, Agent, or Firm*—Arnold & Associates; Gordon T. Arnold

(57) ABSTRACT

A heave suppressed, floating offshore drilling and production platform comprises vertical columns, lateral trusses connecting adjacent columns, a deep-submerged horizontal plate supported from the bottom of the columns by vertical truss legs, and a topside deck supported by the columns. The lateral trusses connect adjacent columns near their lower end to enchance the structural intergrity of the platform. During the launch of the platform and towing in relatively shallow water, the truss legs are stowed in shafts within each column, and the plate is carried just below the lower ends of the columns. After the platform has been floated to the deep water drilling and production site, the truss legs are lowered from the column shafts to lower the plate to a deep draft for reducing the effect of wave forces and to provide heave and vertical motion resistance to the platform. Water in the column shafts is then removed for buoyantly lifting the platform so that the deck is at the desired elevation above the water surface.

27 Claims, 13 Drawing Sheets

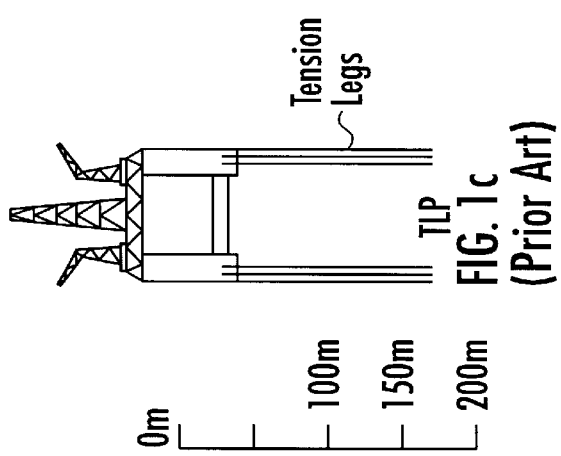
FIG. 1a (Prior Art) Semi-submersible
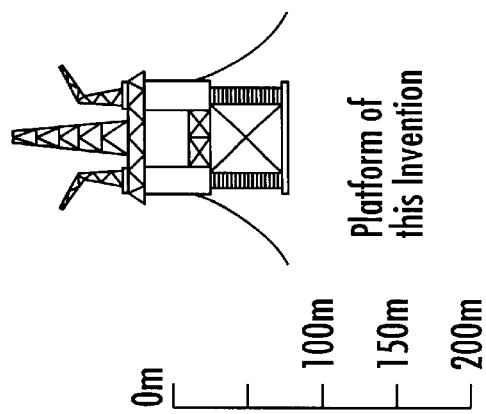
FIG. 1b (Prior Art) FPSO
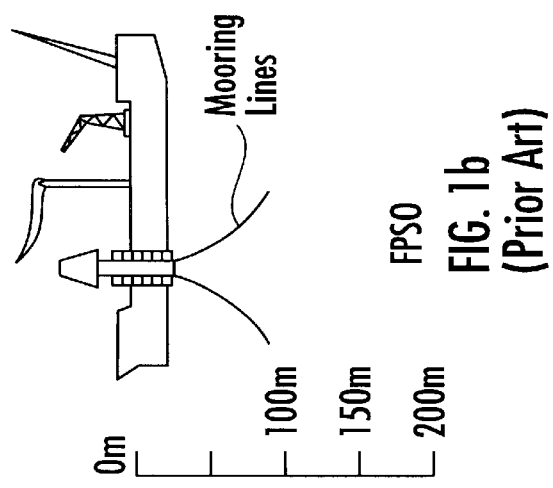
FIG. 1c (Prior Art) TLP
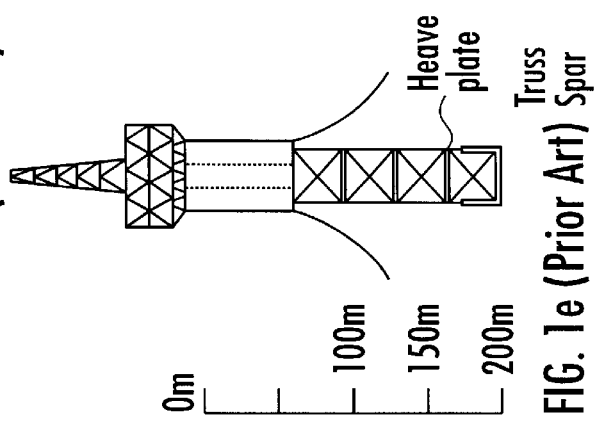
FIG. 1d (Prior Art) Conventional Spar
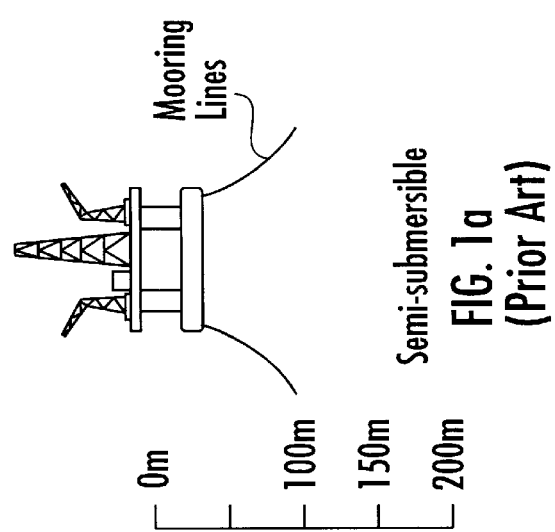
FIG. 1e (Prior Art) Truss Spar
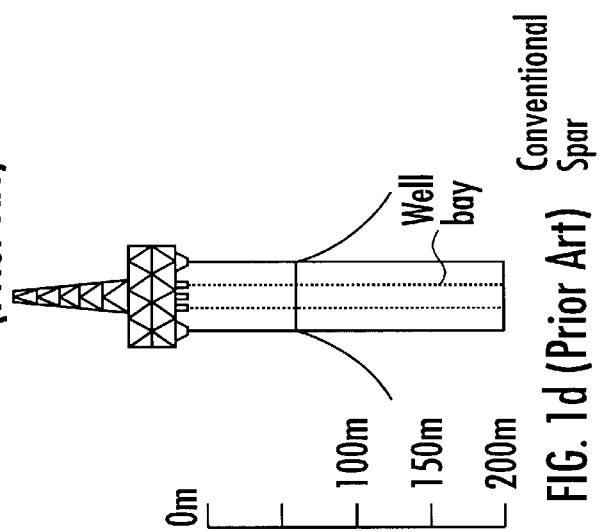
FIG. 1f Platform of this Invention

HEAVE SUPPRESSED OFFSHORE DRILLING AND PRODUCTION PLATFORM AND METHOD OF INSTALLATION

CROSS-REFERENCE TO RELATED APPLICATIONS

Not applicable.

STATEMENT REGARDING FEDERALLY SPONSORED RESEARCH AND DEVELOPMENT

Not applicable.

BACKGROUND OF THE INVENTION

1. Field of the Invention

The present invention relates to offshore platforms and, more particularly, is concerned with floating drilling and production platforms which are used in the exploration and production of offshore oil and gas.

2. Description of the Prior Art

Drilling/production operations in exploration and production of offshore oil and gas require a floating platform that is as stable as possible even in very severe environments. Among the six degrees of freedom of a floating platform, the heave, pitch and roll motions, usually referred to as vertical motions, are particularly important for drilling production operations. For platforms with small vertical motions, rigid, high-pressure risers can be used to connect the platform to the wellhead on the sea floor. With rigid, high-pressure risers, the wellhead is virtually moved from the sea floor to the platform. Therefore, wellhead equipment, such as blowout preventors and control valves, can be installed on the platform. For platforms with large vertical motions, flexible, low-pressure risers must be used, and wellhead equipment must be installed on the sea floor. Equipment placed on the sea floor is much more difficult and costly to manufacture, install, and maintain. In the past, various designs of floating platforms have been developed in the offshore industry. Following is a brief description of the floating platforms which have been designed or suggested for oil gas field development:

1) Semi-submersible Floating Production System (FPS)

A semi-submersible FPS is made up of a number of columns and pontoons. A conventional chain-wire catenary spread mooring system is used for station keeping. FIG. 1a illustrates a typical semi-submersible FPS. The first semi-submersible FPS was installed in 1975 in the central North Sea. The vertical motions of a semi-submersible FPS are too large for rigid, high-pressure risers.

2) FPSO (Floating Production, Storage and Offloading

An FPSO is a monohull, generally ship-shaped, production system that rotates around an integral mooring turret so that the bow generally points to the prevailing seas. Environmental loads and vessel response are thereby reduced. FIG. 1b illustrates a typical FPSO. The earliest FPSO was employed in the West Africa/Mediterranean region in 1977. The main advantage of an FPSO is that it provides large oil storage and offloading capacity, eliminating the need for a pipeline. However, an FPSO also suffers from large vertical motions and high cost for the mooring turret. In addition, it has technology limitation in fluid swivel for high-pressure gas export.

3) TLP (Tension Leg Platform

A TLP is a semi-submersible-like platform which is pulled down to a deeper submergence from its equilibrium position by a number of vertical tensioned legs. FIG. 1c illustrates a typical TLP. The first TLP was installed in the North Sea Hutton Field in 1985. The vertical motions of a TLP are virtually restrained by its tension legs. The tension legs are typically steel tubes that are 28 to 32 inches in diameter and ¾ to 3 inches thick. A TLP can accommodate rigid, high-pressure risers. A disadvantage of a TLP is its high cost due to the fabrication installation of tension legs and subsea piles that are used to secure the tension legs to the sea floor, especially when applied to deep water. Another disadvantage is the additional vessel displacement (about 20% of system weight) required to maintain the tension in the tension legs.

4) Conventional Spar

A spar is a vertical circular cylinder with a small water plane, usually about 30 m in diameter, and a deep draft, usually around 200 m. A conventional chain-wire is used for station keeping. FIG. 1d illustrates a typical conventional spar. The world's first spar was installed in Gulf of Mexico in 1996. The deep draft of a spar is necessary to maintain its stability and to help reduce the vertical wave exciting force acting on it. A spar has very small vertical motions and can accommodate rigid risers. The disadvantages of a spar include high construction and transportation cost due to its large size, high installation cost due to offshore topside-hull mating, limited deck size, and limited well bay space. Moreover, because environmental forces and mooring force act on different part of the long hull, the heel angle of a spar can be quite large, which have a negative impact on riser design.

5) Truss Spar

A truss spar is similar to a conventional spar in structure except that the lower portion of a truss spar is a truss structure, not a circular shell structure. FIG. 1e illustrates a typical truss spar. A truss spar uses heave plates to reduce its heave motion. The truss is used to lower the ballast weight to keep the center of gravity lower than the center of buoyancy. Although its construction cost is expected to be a little lower than that of a conventional spar, a truss spar still suffers from the same disadvantages a conventional spar has. The truss spar concept has not yet been utilized in any oil/gas field development.

The major disadvantages of the above described platforms can be summarized as follows:

(a) Large vertical motions: semi-submersible and FPSO;
(b) Large structure size: spar hull;
(c) Expensive tension legs: TLP;
(d) Difficult offshore deck-hull mating: Spar;
(e) Limited deck area: conventional and truss spar;
(f) Limited well bay space for risers: conventional and truss spar.

Accordingly, several objects and advantages of our invention are:

(a) to provide a floating platform which has small vertical motions,
(b) to provide a floating platform which is much shorter than a conventional or truss spar,
(c) to provide a floating platform which does not require tension legs to restrain its vertical motions,
(d) to provide a floating platform which does not require offshore deck-hull mating,
(e) to provide a floating platform which has large deck area, and
(f) to provide a floating platform which has large space to accommodate risers.

BRIEF SUMMARY OF THE INVENTION

The present invention provides a heave suppressed offshore drilling and production platform that provides the above listed advantages. According to a first aspect of the invention, there is provided a floating offshore drilling and production platform having a deck for drilling and production operations and a plurality of buoyant columns extending from the lower side of the deck, at least some of the columns having vertical shafts therein, the shafts being open on their lower ends. For each column having a vertical shaft therein, a vertically extending truss leg loosely is fitted within the shaft, wherein the truss leg may be lowered axially out the open lower end of the shaft. A plate is attached to the lower ends of the truss legs for suppressing heave and vertical motions of the floating platform when lowered by the truss legs to a position substantially below the water surface.

According to a second aspect of the invention, there is provided a method for installing, at a deep water offshore drilling and production site, a heave suppressed, floating platform. The platform has a deck and buoyant columns. The columns have open shafts therein. The method comprises launching the platform offshore into relatively shallow water; floating the platform to the deep water drilling and production site; and lowering a plate attached to a plurality of truss legs to a position substantially below the bottom of the platform by extending the truss legs out the open shafts of the columns, so that the hydrodynamic mass of the plate suppresses heave and vertical motions of the platform.

According to a third aspect of the invention, there is provided a floating offshore drilling and production platform. The platform includes a deck for drilling and production operations. A plurality of buoyant columns extend from the lower side of the deck. Means is provided for connecting adjacent columns near their lower ends. At least one vertically movable truss is loosely fitted to the columns, wherein the at least one movable truss may be lowered with respect to the columns. Means is attached to the bottom of the at least one movable truss for suppressing heave and vertical motions of the platform when said means is lowered by the movable truss to a position substantially below the water surface.

According to a fourth aspect of the invention, there is provided a method for installing, at a deep water offshore drilling and production site, a heave suppressed, floating platform. The platform has a deck and buoyant columns extending from the lower side of the deck. The method comprises launching the platform offshore into relatively shallow water, floating the platform to the deep water drilling and production site, flooding an open barge affixed to the bottom of a vertically movable truss loosely fitted to the columns for further sinking the lower portion of the platform so that the deck is at the desired elevation above the sea surface, and lowering the open barge to a position substantially below the bottom of the platform by lowering the movable truss with respect to the platform so that the hydrodynamic mass of the open barge suppresses heave and vertical motions of the platform.

According to a fifth aspect of the invention, there is provided a method for installing, at a deep water offshore drilling and production site, a heave suppressed, floating platform. The platform has a deck and buoyant columns extending from the lower side of the deck. The method comprises launching the platform offshore into relatively shallow water; floating the platform to the deep water drilling and production site; and releasing air from an inverted barge affixed to the bottom of a vertically movable truss loosely fitted to the columns for further sinking the lower portion of the platform so that the deck is at the desired elevation above the sea surface. The method further comprises lowering the inverted barge to a position substantially below the bottom of the platform by lowering the movable truss with respect to the platform so that the hydrodynamic mass of the inverted barge suppresses heave and vertical motions of the platform.

According to a sixth aspect of the invention, there is provided a method for installing, at a deep water offshore drilling and production site, a heave suppressed, floating platform. The platform has a deck and columns extending from the lower side of the deck. The method comprises launching the platform offshore into relatively shallow water; floating the platform to the deep water drilling and production site; and flooding a heave pontoon affixed to the bottom of a vertically movable truss loosely fitted to the columns for lowering the heave pontoon to a position substantially below the bottom of the platform, so that the hydrodynamic mass of the flooded heave pontoon suppresses heave and vertical motions of the platform.

According to a seventh aspect of the invention, there is provided a method for installing, at a deep water offshore drilling and production site, a heave suppressed, floating platform. The platform has a deck and columns extending from the lower side of the deck. The method comprises placing a heave pontoon affixed to the bottom of a truss at a convenient place on the sea floor; launching the platform offshore; and floating the platform to a position above the heave pontoon and truss on the sea floor. The method further comprises lifting the truss and heave pontoon from the sea floor to the platform, so that the upper portion of the truss adjoins the lower portion of the platform; and securing the upper portion of the truss to the platform, whereby the heave pontoon suppresses heave and vertical motions of the platform.

BRIEF DESCRIPTION OF THE SEVERAL VIEWS OF THE DRAWING

For a more complete understanding of the invention, and the advantages thereof, reference is now made to the following detailed description of the invention taken in conjunction with the accompanying drawings. In the drawings, closely related figures may have the same number, but different alphabetic suffixes.

FIGS. 1a to 1e illustrates several floating platforms of the prior art.

FIG. 1f illustrates a first embodiment of the heave suppressed offshore drilling and production platform of the present invention.

DETAILED DESCRIPTION OF THE INVENTION

Figure 2:
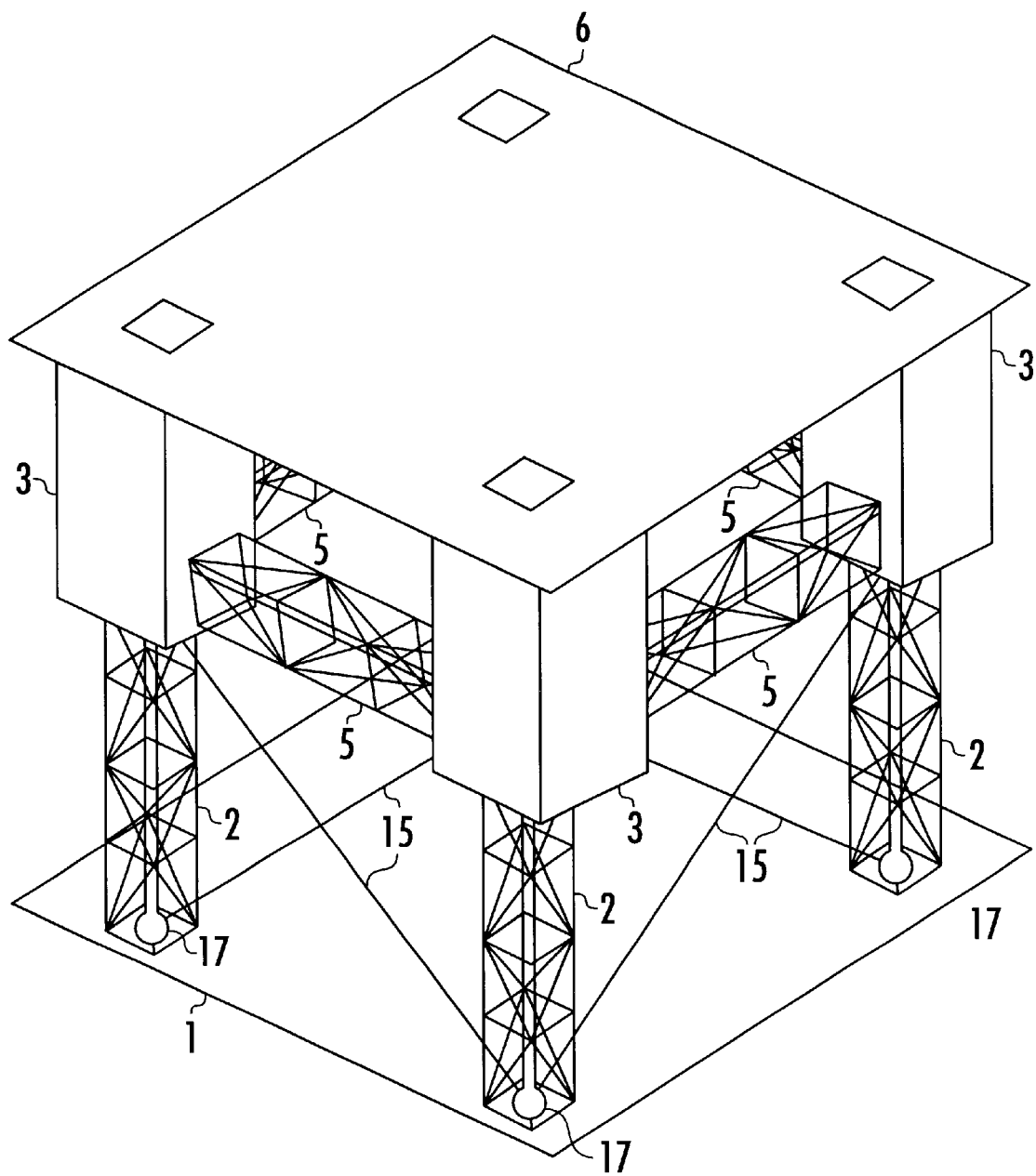
FIG. 2 shows a perspective view of a first embodiment of the heave suppressed platform of this invention.

Referring now to the drawings, and more particularly to FIG. 2, there is shown a perspective view of a first embodiment of the heave suppressed platform of this invention. In this embodiment, the platform comprises five major components: (1) a large horizontal plate 1 providing vertical motion resistance (VMR); (2) four vertical columns 3 having a square cross-section and partially submerged in water; (3) four vertical truss legs 2 connecting the columns 3 with the VMR plate 1; (4) lateral trusses 5 connecting adjacent columns 3 to enhance structural integrity, and (5) a deck 6 supported by columns 3 to accommodate drilling and production equipment. These components may have the following dimensions: Plate 1 may be approximately 75 m×75 m in width and breadth. Columns 3 may be approximately 18 m×18 m in cross section, and have a height of approximately 42 m, of which about 25 m is submerged in water. Truss legs 2 may be approximately 55 m in height. Lateral trusses 5 may be approximately 39 m long.

A graphic comparison of the platform of this embodiment of the invention with the prior art platforms in configuration and size is shown in FIGS. 1a to 1f. The draft of the columns 3 is about 25 m, which is comparable to that of a semi-submersible, and much smaller than that of a spar. The VMR plate 1 is about 80 m below the water surface, or 40% of a spar's total draft. The lateral trusses 5 are used in place of pontoons to provide structural integrity, to reduce wave exciting forces, and to raise the center of buoyancy of the platform for increasing its stability and or reducing the amount of ballast required to lower the center of gravity. The deck 6, similar to that of a TLP, sits on the top of the four widely separated columns and provides a larger deck area than a spar does. The space for risers under the deck is limited only by the lateral trusses 5 and the column spacing, and is much larger than the well bay of a spar.

The hydrostatic stability of a floating structure is normally determined by its displacement and water plane shape and area. Generally, a structure having a large, widely separated water plane area and a small displacement has good hydrostatic stability. A spar does not have good stability because its water plane area is small and not widely separated. Therefore deep, heavy ballast must be used in a spar to lower its center of gravity. This is one of the reasons that a spar has such a massive displacement and large size. For the platform of this invention, stability is not a problem since the columns have sufficient water plane area and are adequately far apart from each other. Because of its good hydrostatic stability, the platform of this invention does not require a large amount of ballast to lower the center of gravity of the system. Therefore, deck load displacement ratio is increased.

Figure 3A:
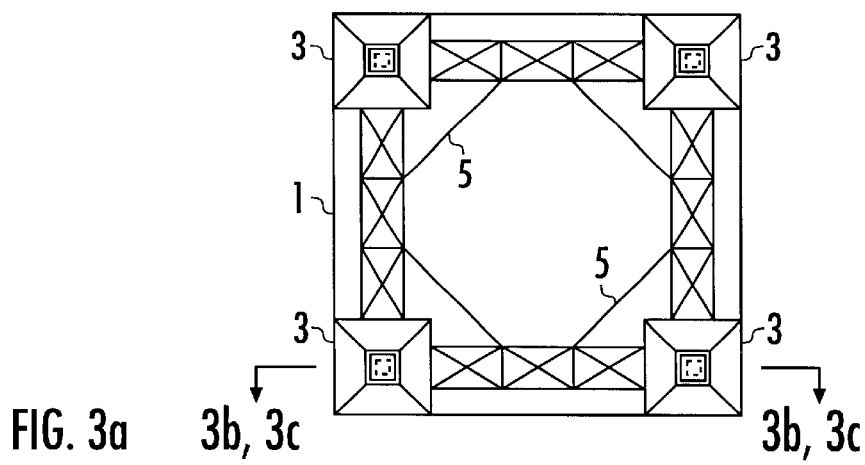
FIG. 3a is a plan view of the platform of FIG. 2, with the deck removed.
Figure 3B:
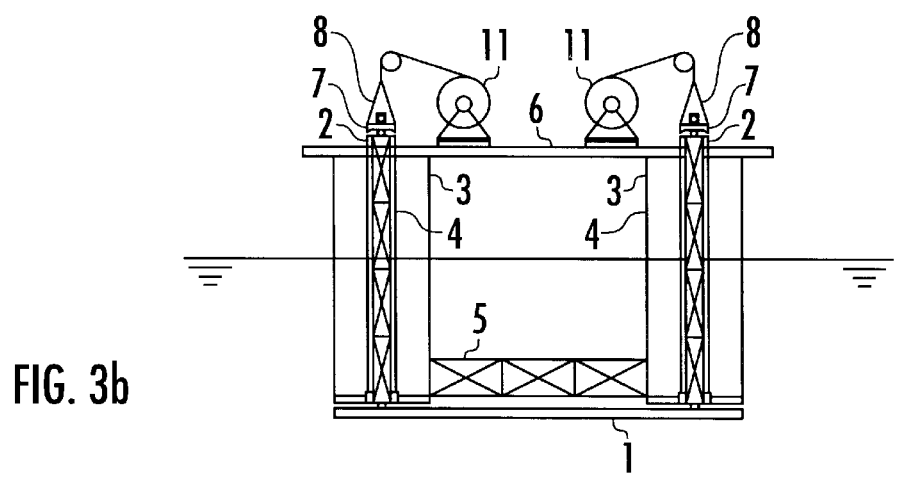
FIG. 3b is a sectional elevation view taken along line A—A in FIG. 3a, with the truss legs and VMR plate in their raised position.
Figures 3C, 3D:
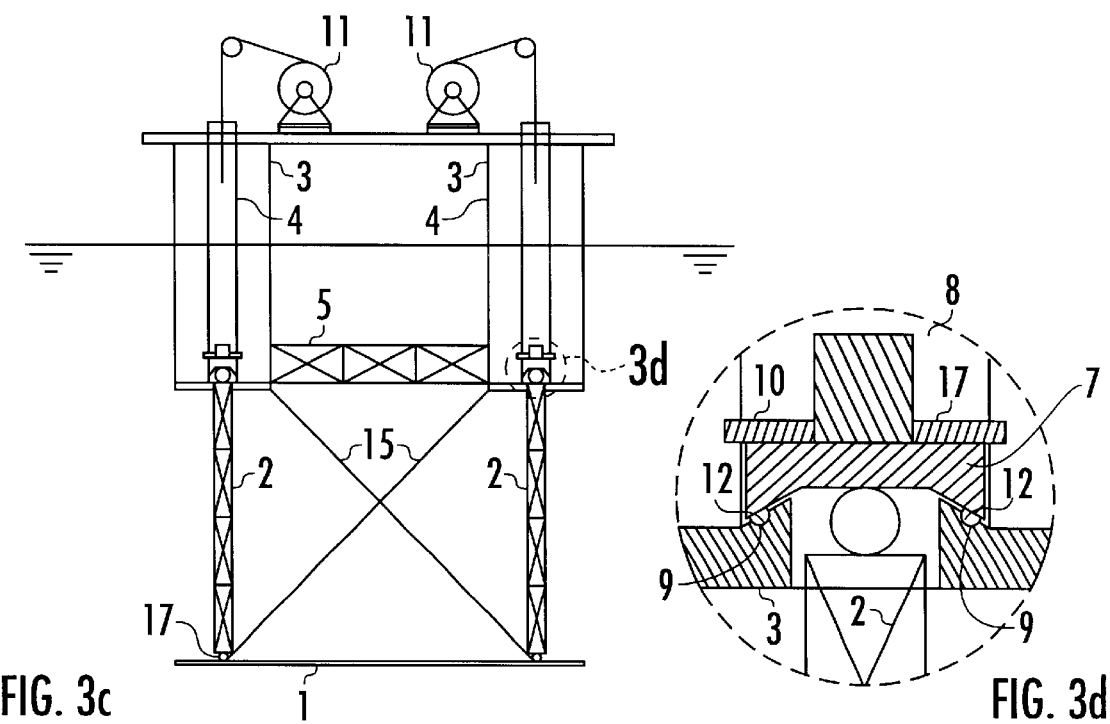
FIG. 3c is a sectional elevation view taken along line A—A in FIG. 3a, with the truss legs and VMR plate in their lowered position.
FIG. 3d is a detail elevation view of the mating of the upper portion of a truss leg with the lower portion of a column of the platform of FIG. 2, with the truss legs is in their lowered position.

The platform of FIG. 2 is fabricated and installed at a deep water offshore drilling and production site as follows: The VMR plate 1 is fabricated first. Then, the columns 3, lateral trusses 5, and deck 6 are constructed on top of the VMR plate. Each column has a vertical shaft 4 throughout its length at its center. The truss legs 2 are placed into the column shafts 4 and joined to VMR plate 1 through universal joints 17. FIG. 3a is a plan view of the platform with the truss legs 2 installed in the column shafts 4. For clarity, the deck 6 is not shown in FIG. 3a. With the deck 6 installed on top of the columns 3, the system, as shown in FIG. 3b, is then launched into shallow water as one piece. The column shafts will be flooded after launch. The platform is then floated to the deep water drilling and production site. The truss legs 2 and the VMR plate 1 are then lowered by winches 11 on the deck 6 until the caps 7 of the truss legs 2 reach the bottom of the columns 3, as shown in FIG. 3c. U.S. Pat. No. 5,609,442 to Edward Horton for "Offshore Apparatus and Method for Oil Operations" discloses a similar method for lowering a telescoping hull structure from an upper hull by means, of support lines connected to mooring winches mounted on the upper hull. See Horton FIGS. 7, 12, and 15 and column 5, lines 9–15, column 5, line 66—column 6, line 7, and column 6, lines 33–38. As illustrated in FIG. 3d, a seal or flexible band 9 made of elastomeric material, such as rubber, is placed in advance in a notch 12 on the bottom of each column 3. When the truss legs 2 are in position, the flexible bands 9 are pressed by the weight of the truss legs 2 and VMR plate 1. As a result, the column shafts 4 become watertight. Water in the column shafts 4 is then removed, and rigid members or beams 10 are installed to secure the truss leg caps to the columns 3. Clump weights 8 are used to prevent the truss legs from being lifted up by hydrostatic pressure when the water in the column shafts is being removed. The clump weights are removed after the beams 10 are installed.

Universal joints 17, which allow free rotation in any direction, are installed at the truss leg 2 to column 3 connections (seen in FIGS. 3c and 3d), and at truss leg 2 to VMR plate 1 connections (seen in FIG. 3c). Referring to FIGS. 2 and 3c, diagonal cable bracing 15, connecting opposite truss legs 2 with columns 3 and VMR plate 1, is used to provide an appropriate amount of rotational stiffness to the truss-plate structure. The cable 15 can be chain, steel wire or synthetic rope. A spring may be attached to the cable to reduce its stiffness. Because the truss has a finite rotational stiffness from the diagonal cable bracing, the truss-plate structure is compliant to a certain extent in the horizontal direction, and rigid in the vertical direction. Therefore, the structure can accommodate the relative movement between the risers and hull due to surge sway and pitch roll motions of the hull, and the need for a riser keel joint at the heave plate is eliminated. This can result in significant cost savings in riser system cost.

The following analysis explains why does the platform of this invention has small vertical motions. A floating platform is analogous to a spring-damper-mass system and its motion characteristics are determined by its mass (summation of static mass $M_s$ and hydrodynamic mass $M_D$), vertical stiffness k, the magnitude of damping force, and the magnitude of the wave exciting force acting on it. The natural (resonance) period of the platform's heave motion is $$2\pi\sqrt{\frac{M_S + M_D}{k}}.$$

For the heave motion of a floating system to be small, this natural period must be out of the range of ocean wave period. Period of ocean waves usually falls in the range of 4 to 20 seconds. A spar takes the strategy of a large mass and a small stiffness and can usually realize a natural heave period of 25 seconds, while a TLP uses very stiff vertical tension legs and keeps its heave natural period at around 2 seconds. A TLP has the smallest vertical motions among all the platforms discussed herein. The vertical motions of a spar are not as small as those of a TLP, but are sufficiently small to accommodate rigid risers. A semi-submersible or a FPSO usually has a heave natural period of 10 to 20 seconds. Therefore, their vertical motions are large. The vertical stiffness of a floating object is controlled by its water plane area, except in the case of a TLP. A small water plane area leads to a small vertical stiffness. Water plane area is also governed by stability and or variable deck load requirements, and cannot be reduced infinitely. A spar's small water plane shape and area cannot provide hydrostatic stability. The hydrostatic stability of a platform is increased by lowering the system's center of gravity. This is one of the reasons that a spar has an extraordinary large draft. In the platform of this invention, the large VMR plate creates a great amount of hydrodynamic mass[1], about 0.1457π× specific weight of water×(length of VMR plate)$^3$≈200,000 ton, or 6 times the system's total static mass, pushing the natural period of the platform to about 29 seconds. This is possible because the hydrodynamic mass of a plate increases rapidly with its length (proportional to the cube of the length).

[1] Hydrodynamic mass: When a body accelerates in a fluid, it will bring a certain amount of the fluid to accelerate with it. Hydrodynamic mass is a measure of the amount of the fluid moving with the body. It depends on the shape of the body and the direction of its motion.

In addition, the platform of this embodiment of the invention utilizes the following two measures to minimize vertical wave exciting force: First, it eliminates the pontoons that are normally present in a semi-submersible platform. Second, by lowering the truss legs, the VMR plate is lowered to a level significantly below the bottom of the columns. Replacing the pontoons with the lateral trusses will reduce wave forces acting on the platform because the relatively small members of a truss structure experience very little wave force. Lowering the VMR plate will make it experience less wave pressure. The column draft is kept at a convenient level of approximately 25 m for low construction cost. The total draft of approximately 80 m is only 40% of a typical spar's draft.

Figure 4A:
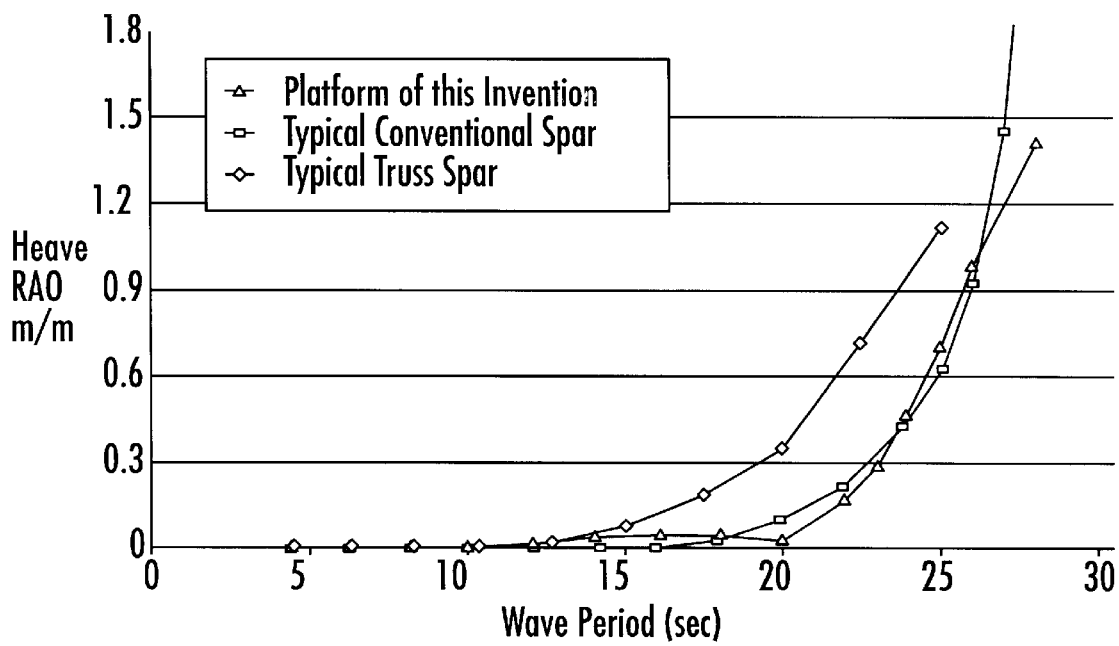
FIG. 4a illustrates a comparison of the heave motion response amplitude operator for the platform of FIG. 2, for a typical conventional spar, and for a typical truss spar.
Figure 4B:
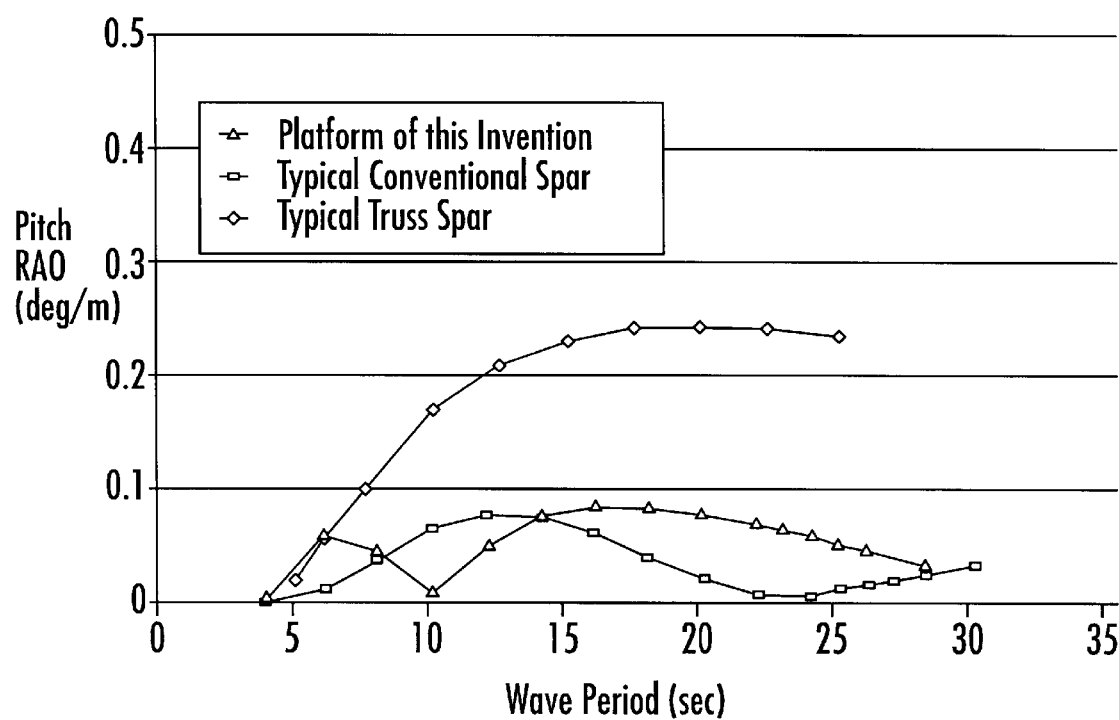
FIG. 4b illustrates a comparison of the pitch motion response amplitude operator for the platform of FIG. 2, for a typical conventional spar, and for a typical truss spar.

The motion characteristics of a platform are measured by motion Response Amplitude Operator (RAO) that is defined as the motion response amplitudes of the platform in regular waves of unit height. The motion RAO's of the platform of this embodiment of the invention, together with those of a typical truss spar and a typical conventional spar, are plotted in FIGS. 4a and 4b. These RAO's are calculated using classic linear wave theory. It is obvious that the floating platform of this invention is comparable to a typical conventional spar and is superior to a typical truss spar in heave motion performances for wave periods greater than 15 sec.

The large, deeply submerged VMR plate 1 will also introduce a great amount of hydrodynamic mass in pitch and roll motions, which helps significantly in minimizing these motions. In this sense, heave plates used in a truss spar are different from the VMR plate in the platform of this invention because a heave plate does not help in reducing the pitch motion of a truss spar.

From the description above, a number of advantages of the floating platform of FIG. 2 are evident:
a) The large horizontal plate produces a large hydrodynamic mass.
b) The deep draft of the plate reduces the effect of wave exciting forces
c) The elimination of pontoons reduces the effect of wave exciting forces and raises the center of buoyancy of the platform, thus increasing its stability and or reducing the amount of ballast required.
d) The small column draft reduces fabrication costs.
e) The platform may be launched and floated to the drilling and production site in one piece. The truss legs and VMR plate are then lowered on site to their final position.
f) The platform has small vertical motions in comparison to those of a conventional spar.
g) The draft of the platform is about 40% of a spar's draft.
h) There is no need for expensive tension legs to restrain vertical motions.
i) The platform can be built in one piece.
j) The platform has a large deck area in comparison to that of a spar.
k) The platform provides a large space under the deck for risers.

Accordingly, the reader will see that the floating platform of this invention utilizes a large, deep submerged, horizontal plate to increase hydrodynamic mass and achieve small vertical motions, similar to or better than those of a spar, while its draft is only about 80 m, or 40% of a spar's. It does not require tension legs to restrain its vertical motions. In addition, it provides sufficient deck area for deck machinery and equipment, and sufficient space for the risers.

Many variations to the above described platform are possible. For example, the platform can have three columns and three truss legs, or a column in the middle of the platform. The cross-section of the column can have other shapes, such as circular, square with the corners rounded, etc. The VMR plate can have other shapes, such as circular, triangular, etc.

Figure 4C:
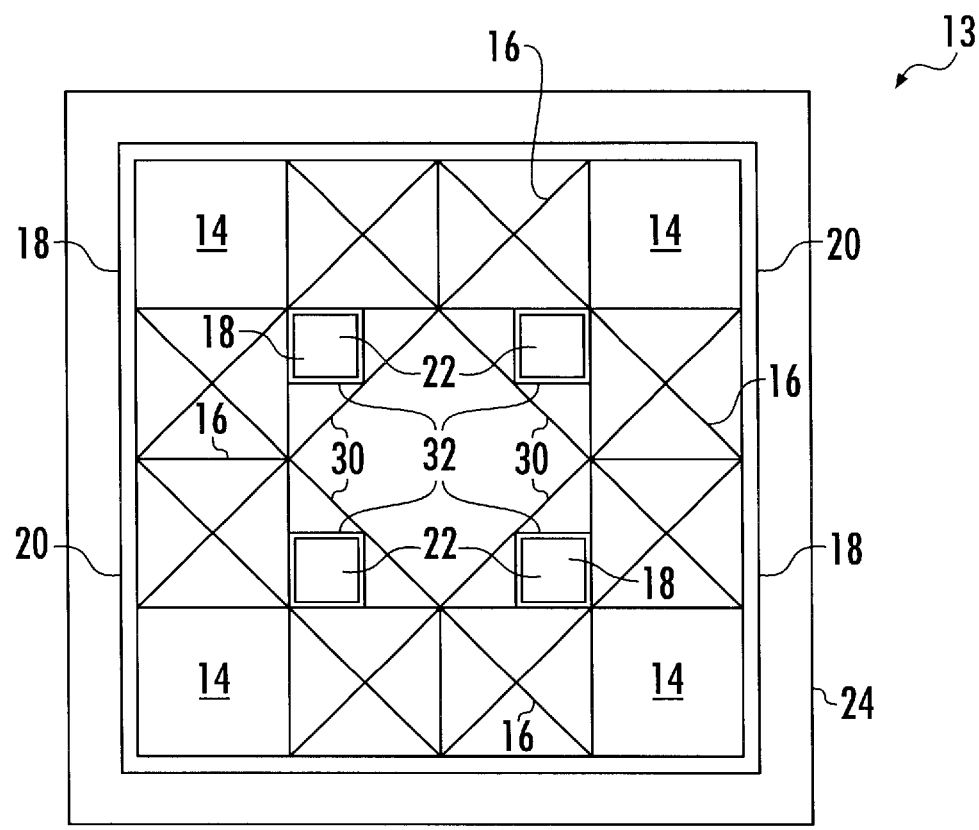
FIG. 4c is a plan view of a second embodiment of the platform of the invention.
Figure 5:
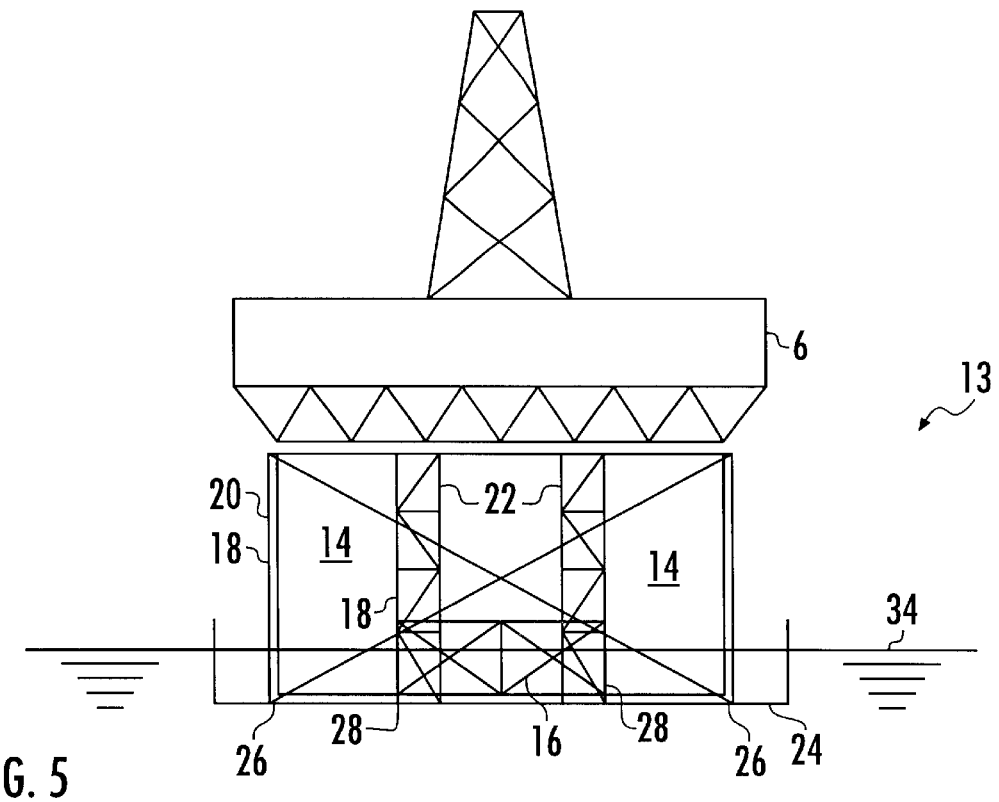
FIG. 5 is a side elevation view of a second embodiment of the platform of the invention, with the movable truss in its raised position.

Referring now to FIGS. 4C and 5, there is shown a plan view and an elevation view, respectively, of a second embodiment of the heave suppressed platform, generally designated 13, of this invention. For clarity, the deck 6 of platform 13 is not shown in FIG. 4C. Deck 6 of platform 13 is supported by four buoyant columns 14. The lower ends of adjacent columns 14 are rigidly connected together by base trusses 16 extending between them. In this embodiment of the invention, base trusses 16 are used instead of pontoons to connect columns 14 to both reduce wave loads and to raise the center of buoyancy of platform 13. Raising the center of buoyancy of a platform can either increase the stability of the platform, or reduce the amount of ballast required to lower the center of gravity of the platform.

Figure 6:
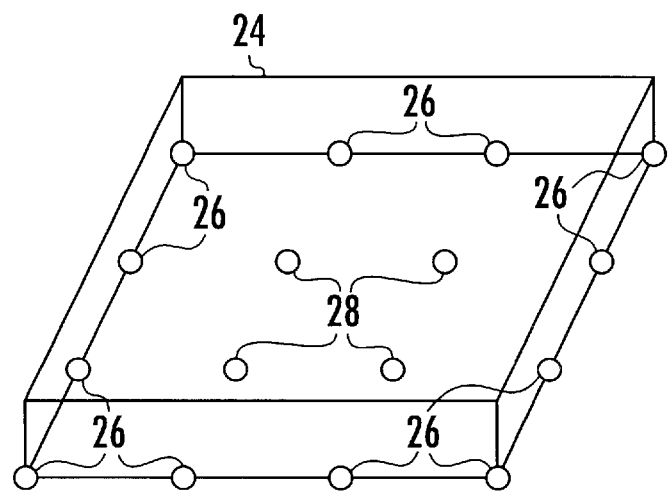
FIG. 6 is a perspective view of the open barge of the platform of FIG. 5.

Vertically movable truss 18 is loosely fitted to columns 14, and may be lowered and raised with respect to columns 14. Movable truss 18 includes exterior truss 20 that surrounds columns 14 when movable truss 18 is in its raised position. Movable truss 18 also includes an inner truss tower 22 adjacent the inside corner of each column 14. Open barge 24 is attached to the bottom of movable truss 18. Referring to FIG. 6, open barge 24 connects to exterior truss 20 at support points 26 and 28 and connects to inner truss towers 22 at support points 28. As seen from FIG. 4C, base trusses 16 are interconnected by diagonal members 30 which enable platform 13 to better resist wave loads acting on platform 13 from various directions. Members 32 of base trusses 16 surround a portion of each inner truss tower 22 for guiding inner truss towers 22 as they are lowered or raised with movable truss 18.

Figure 7:
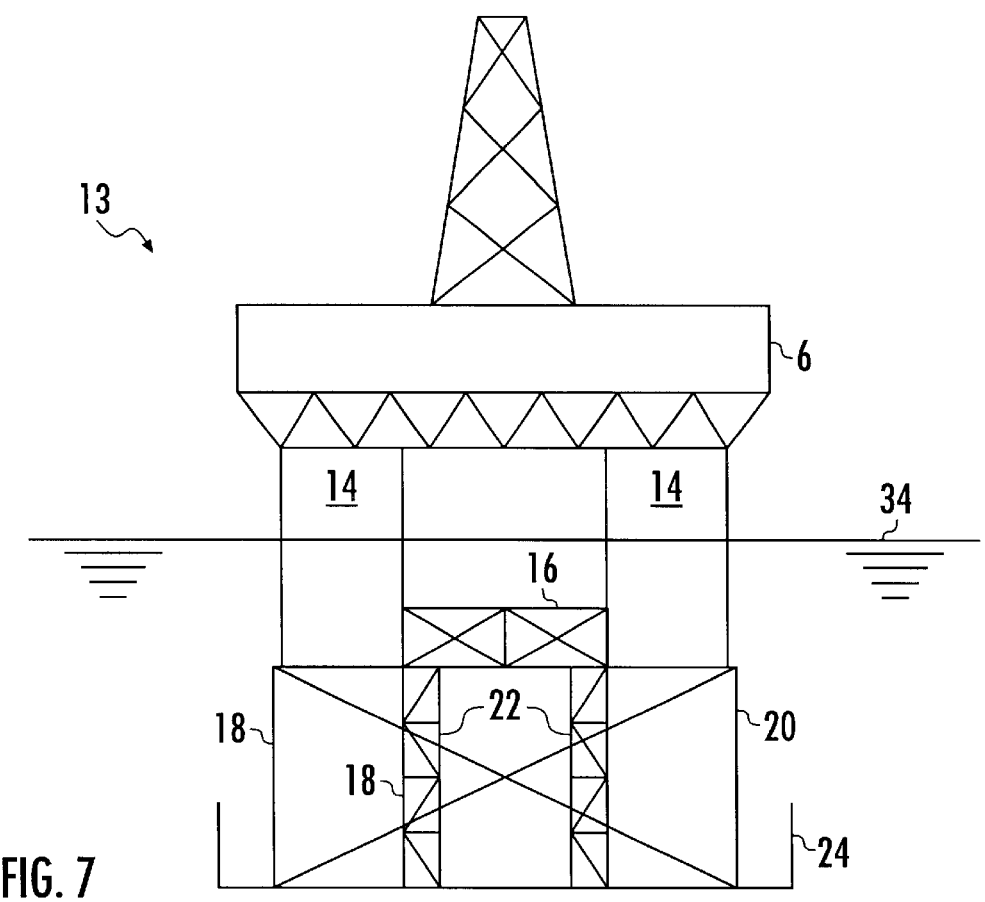
FIG. 7 illustrates the platform of FIG. 5 with the movable truss in its lowered position.

FIGS. 5 and 7 sequentially illustrate the method for installing heave suppressed platform 13 at a deep water offshore drilling and production site. First, platform 13 is launched into relatively shallow water with its movable truss 18 in its raised position, as it appears in FIG. 5. In this condition, platform 13 is floated aboard open barge 24, which contains no water. Platform 13 is then floated to the deep water drilling and production site. There, open barge 24 is flooded, which reduces the buoyancy of platforms 13 and sinks the lower portion of platform 13 so that deck 6 is at the desired elevation (not shown) above the sea surface 34. Open barge 24 can be flooded by removing a cover plate (not shown) at its center bottom to expose an opening (not shown) for risers to pass through open barge 24 after it is installed. As seen in FIG. 7, movable truss 18 is then lowered so as to submerge open barge 24 to a position substantially below the sea surface 34. Movable truss 18 may be lowered by cables connected to winches (not shown) on platform 6. Finally, the upper end of movable truss 18 may be secured to the lower fixed portion of platform 13. In this position, the hydrodynamic mass of open barge 24 suppresses heave and vertical motions of platform 13.

Figure 8:
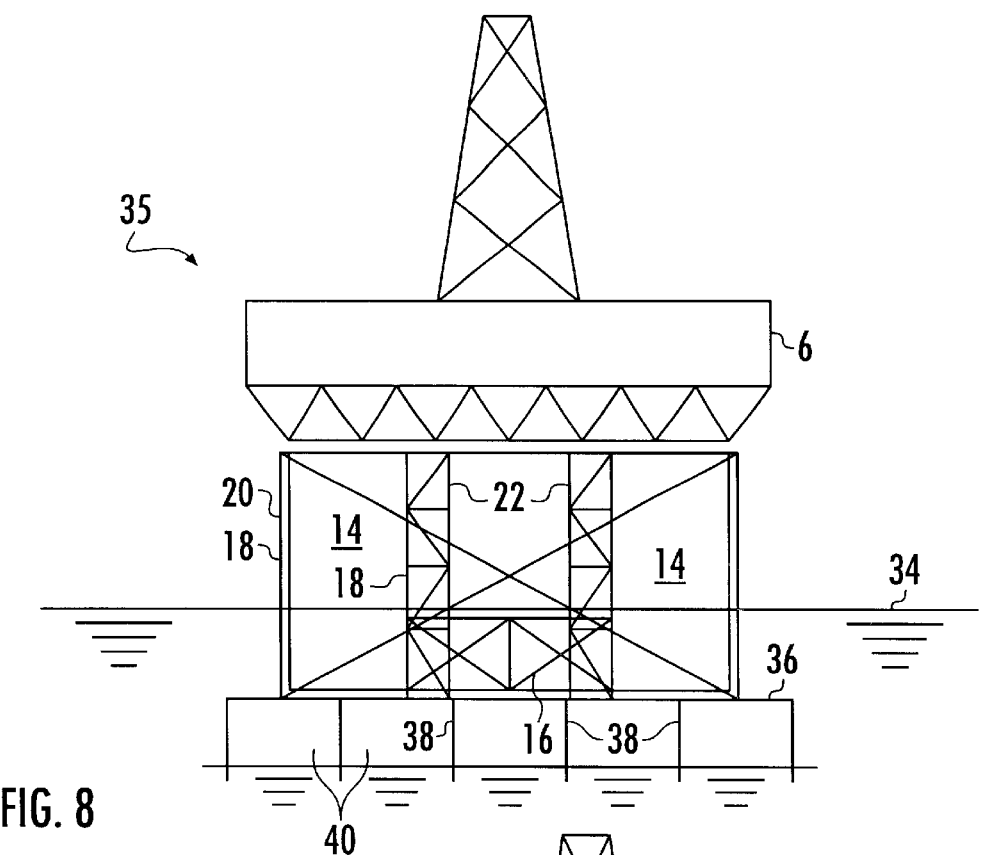
FIG. 8 is a side elevation view of a third embodiment of the platform of the invention, with the movable truss in its raised position.
Figure 9:
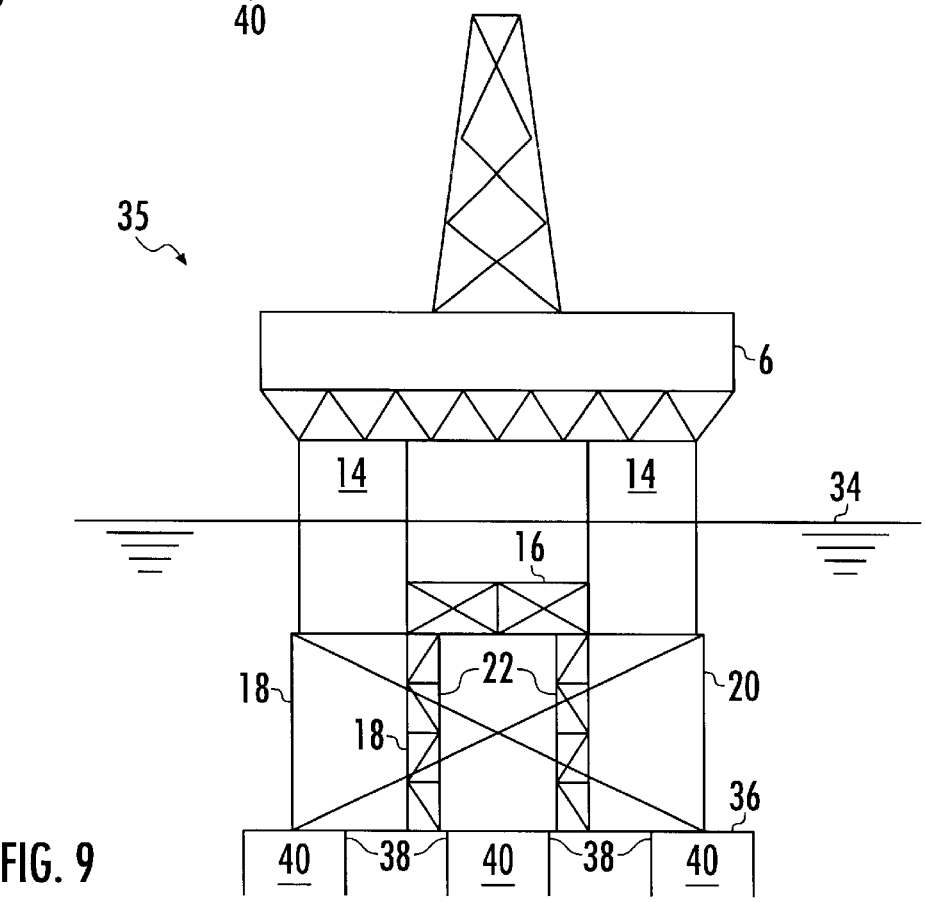
FIG. 9 illustrates the platform of FIG. 8 with the movable truss in its lowered position.

Referring now to FIGS. 8 and 9, there are shown elevation views of a third embodiment of the heave suppressed platform, generally designated 35, of this invention. Platform 35 is substantially similar to platform 13 of FIGS. 4C–7, except that open barge 24 is here replaced by an inverted open barge 36 attached to the bottom of movable truss 18. Vertical partitions 38 attached to the lower surface of inverted open barge 36 create a plurality of open compartments 40 in open barge 36. Having open barge 36 subdivided into compartments improves its stability and that of platform 35.

Platform 35 is installed at a deep water offshore drilling and production site in a manner similar to that described above with reference to platform 13 and FIGS. 5 and 7, except as follows. When initially launched into shallow water, platform 35 is buoyantly supported by air contained within open compartments 40 of inverted barge 36, as seen in FIG. 8. When floating platform 35 arrives at the deep water installation site, the entrapped air is released from compartments 40, which reduces the buoyancy of platform 35 and sinks the lower portion of the platform so that deck 6 is at the desired elevation (not shown) above the sea surface 34.

Figure 10A:
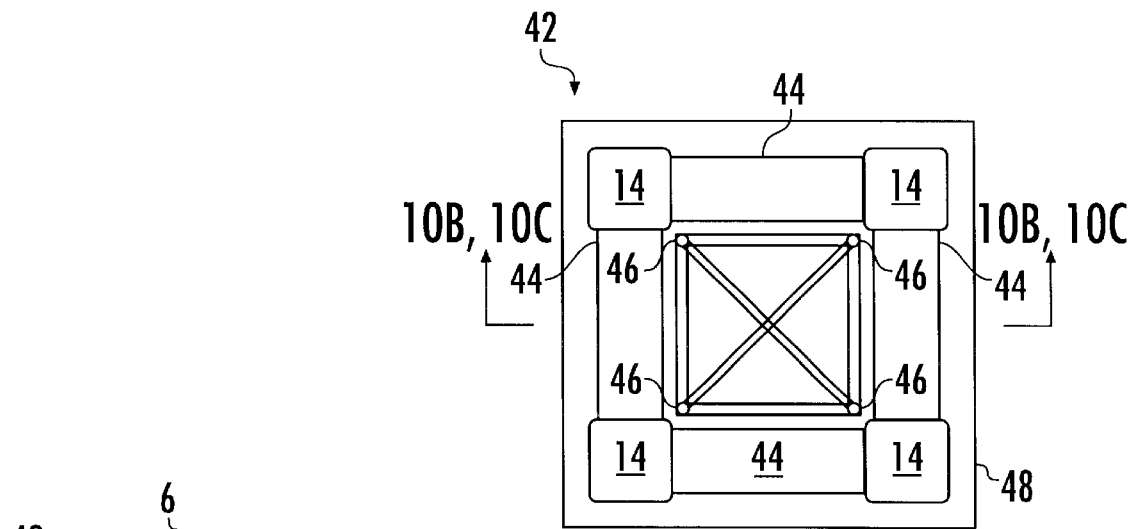
FIGS. 10A, 10B, and 10C illustrate a fourth embodiment of the platform of the invention.
Figure 10B:
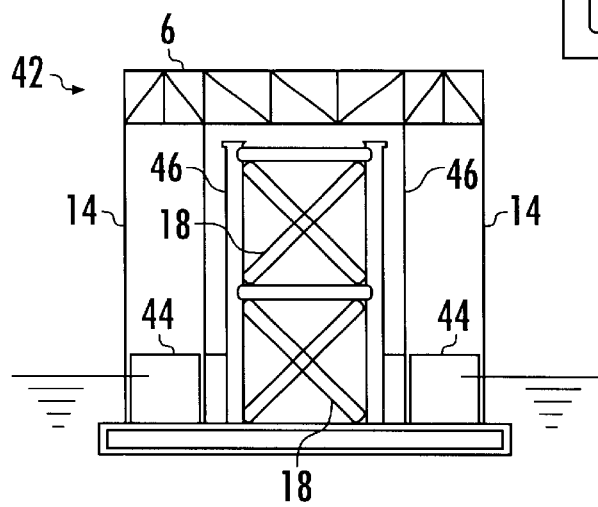
Figure 10C:
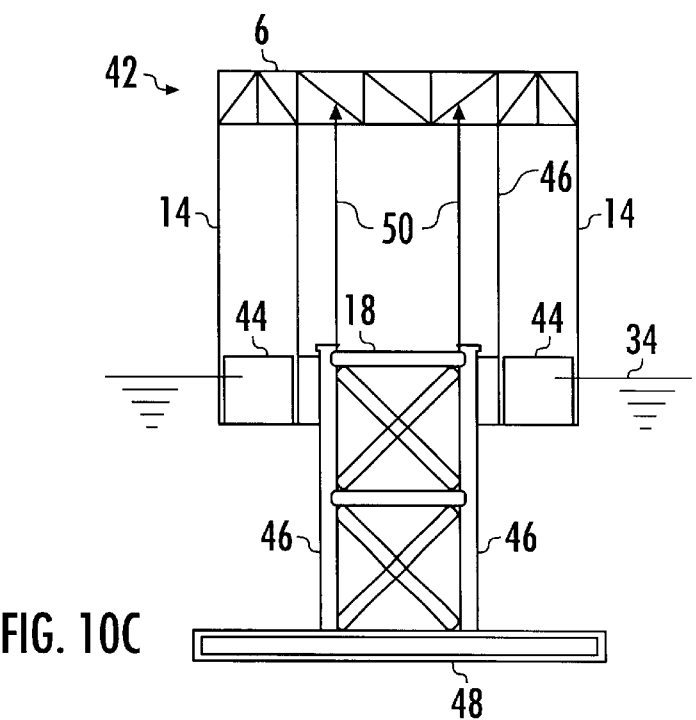

Referring now to FIGS. 10A, 10B, and 10C, there are shown plan and elevation views of a fourth embodiment of the heave suppressed platform, generally designated 42, of this invention. FIGS. 10B and 10C are cross-sectional views taken at plane 10—10 in FIG. 10A. For clarity, deck 6 is not shown in the plan view of FIG. 10A. The lower ends of adjacent columns 14 are rigidly connected together by hull pontoons 44 which may be filled with air or water to adjust the buoyancy of platform 42.

Vertically movable truss 18 is loosely fitted within the open enclosure formed by columns 14 and hull pontoons 44. Movable truss 18 includes vertical chords 46 at its corners. A chord 46 is adjacent each of the columns 14 when movable truss 18 is in its raised position. Heave pontoon 48 is attached to the bottom of movable truss 18. Heave pontoon 48 may be filled with air or water to adjust the buoyancy of movable truss 18.

FIGS. 10B and 10C illustrate the method of installing heave suppressed platform 42 at a deep water site. When initially launched into shallow water, platform 42 is buoyantly supported by air contained within hull pontoons 44 and heave pontoon 48, as seen in FIG. 10B. When platform 42 arrives at the installation site, heave pontoon 48 is flooded. This removes the buoyant force holding movable truss 18 in its raised position, allowing movable truss 18 to be lowered so as to submerge heave pontoon 48 to a position substantially below the sea surface 34, as seen in FIG. 10C. Movable truss 18 is lowered by cables 50 connected to winches (not shown) on platform 6. In this position, the hydrodynamic mass of heave pontoon 48 suppresses heave and vertical motions of platform 42.

Figure 11A:
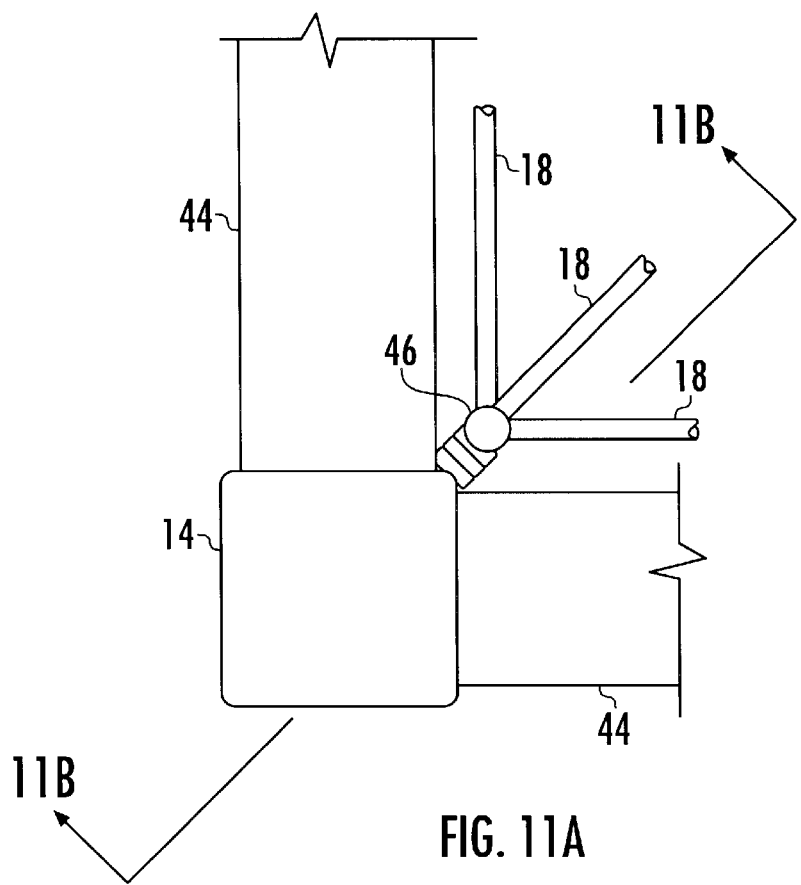
FIGS. 11A and 11B illustrate a manner in which the movable truss of FIGS. 10A, 10B, and 10C may be secured to the corner columns of the platform.
Figure 11B:
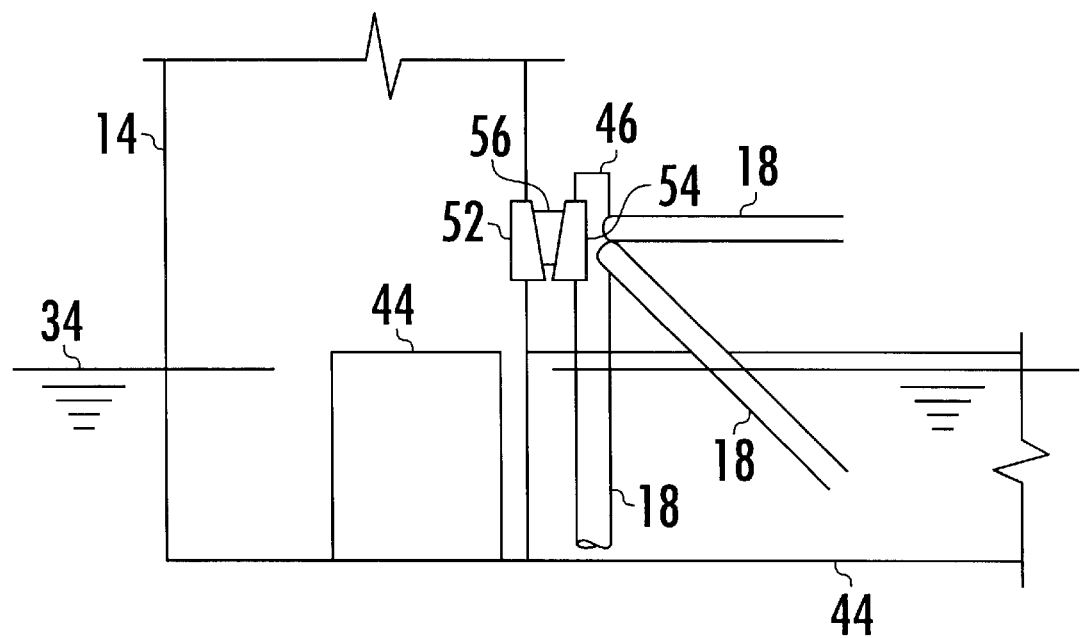

The upper end of movable truss 18 is then secured to columns 14 of platform 42 to retain movable truss 18 in its lowered position. One manner of accomplishing this is shown in FIGS. 11A and 11B. FIG. 11A is an enlarged plan view of the connection, and FIG. 11B is a partial elevation view taken along plane 11—11 in FIG. 11A. At each upper corner of movable truss 18, wedge 56 is driven between first wedge block 52 attached to the lower part of column 14 and second wedge block 54 attached to a corresponding chord 46 of movable truss 18. The wedge blocks 52, 54, and 56 are then welded together above the water level to secure movable truss 18 to columns 14. After securing truss 18 in place, hull pontoons 44 are then flooded to further sink the lower portion of platform 42 so that deck 6 is at the desired level above the sea surface 34.

Figure 12A:
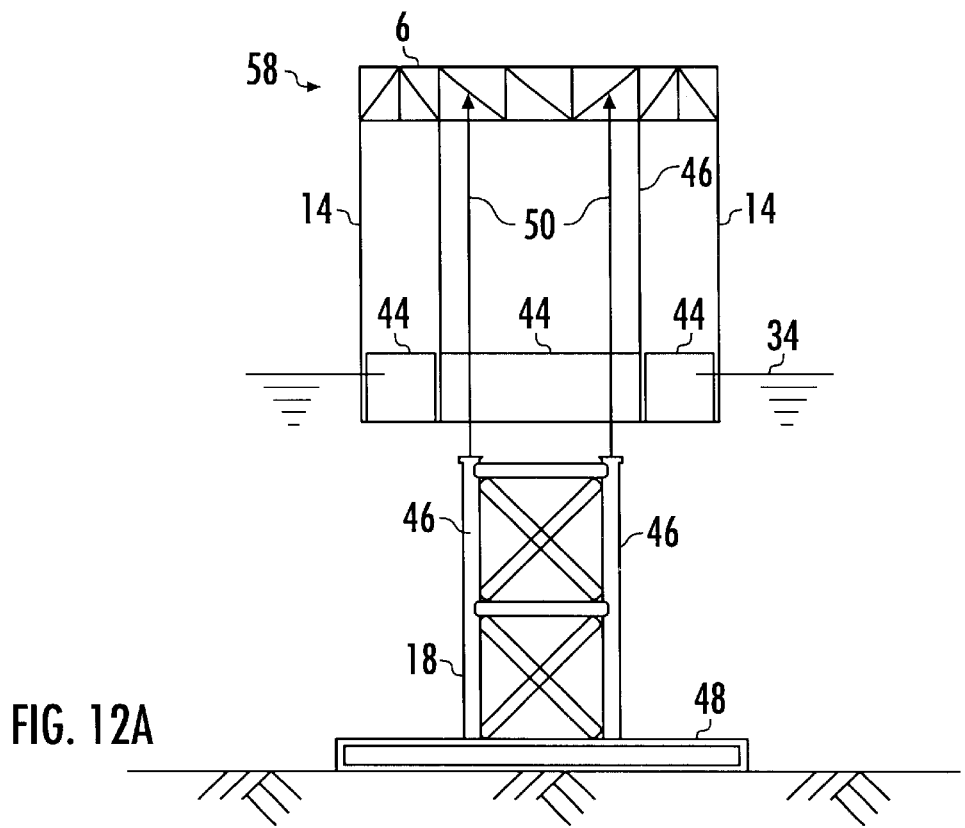
FIGS. 12A and 12B illustrate a fifth embodiment of the platform of the invention.
Figure 12B:
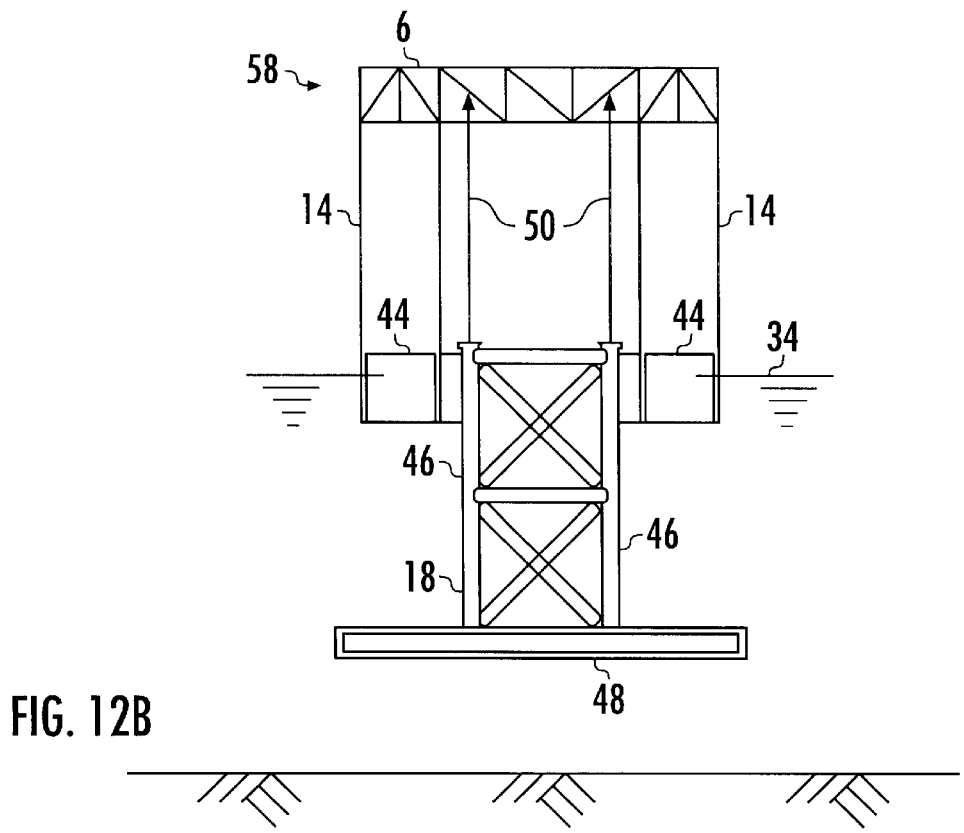

Referring now to FIGS. 12A and 12B, there are shown elevation views of a fifth embodiment of the heave suppressed platform, generally designated 58, of this invention. Platform 58 is identical in structure to platform 42 of FIGS. 10A, 10B, and 10C, but is installed in a different manner. First, movable truss 18 with attached heave pontoon 48 are placed on the sea floor at a selected installation site, which may be a temporary site for purposes of this installation. The upper portion of platform 58 is then launched and floated directly above movable truss 18, as seen in FIG. 12A. Truss 18 and heave pontoon 48 are then lifted by cables 50 connected to winches (not shown) on deck 6 to the position shown in FIG. 12B. The chords 46 of truss 18 are then secured to columns 14, and hull pontoons 44 are flooded, as described above with reference to FIGS. 11A and 11B.

Figure 13A:
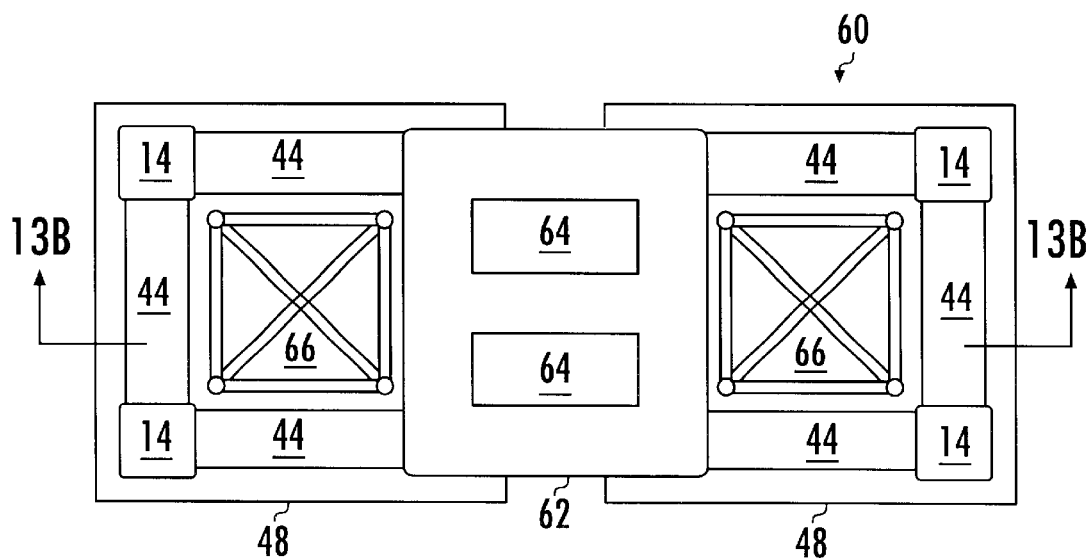
FIGS. 13A and 13B illustrate a sixth embodiment of the platform of the invention.
Figure 13B:
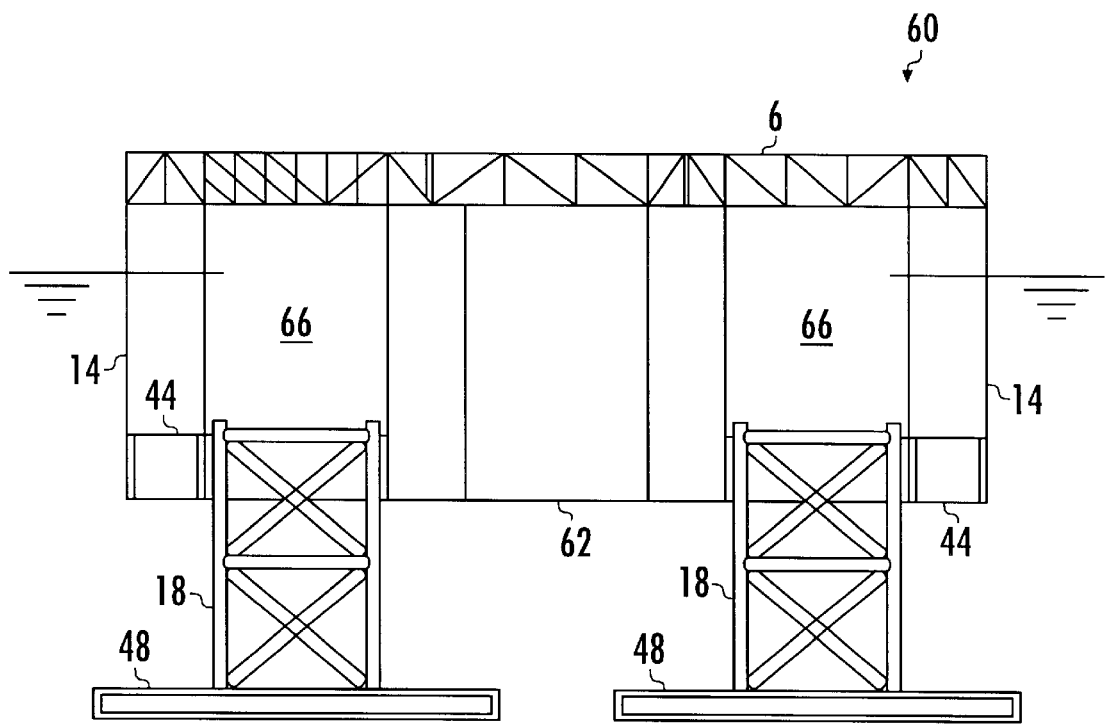

FIGS. 13A and 13B illustrate a sixth embodiment of the heave suppressed platform, generally designated 60, of this invention. Platform 60 may be considered as two platforms 42 or 58, described above with reference to FIGS. 10 and 12, connected together by a center column 62 which replaces a pair of corner columns 14 on each of the connected platforms. Center column 62 includes two open moon pools 64. Each well 66 of platform 60 is fitted with a separate movable truss 18 having a separate heave pontoon 48 on its bottom. Platform 60 may be installed as described above for platform 42 (FIGS. 10A–10C) or for platform 58 (FIGS. 12A–12B).

Figure 14C:
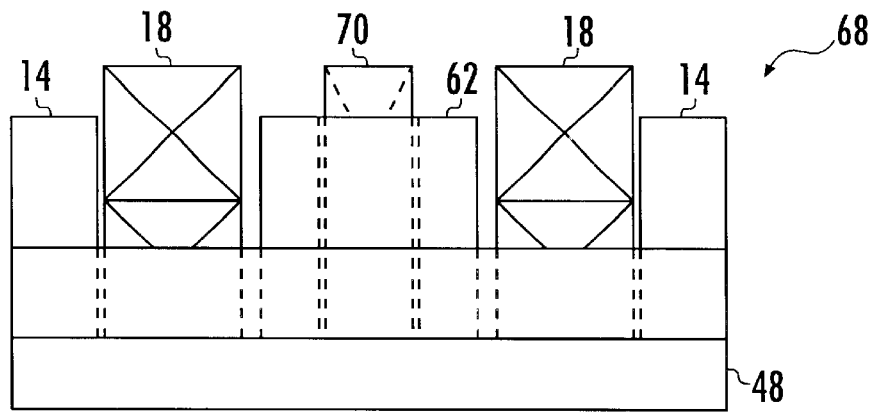
FIGS. 14A, 14B, and 14C illustrate a seventh embodiment of the platform of the invention.
Figure 14B:
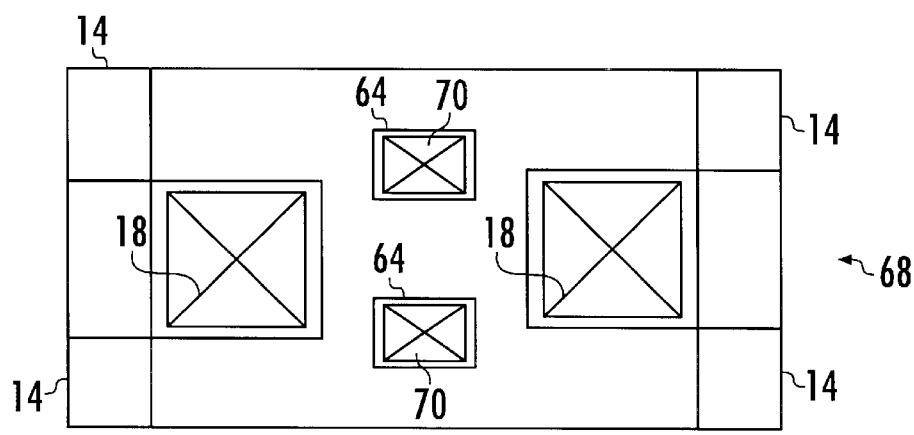
Figure 14A:
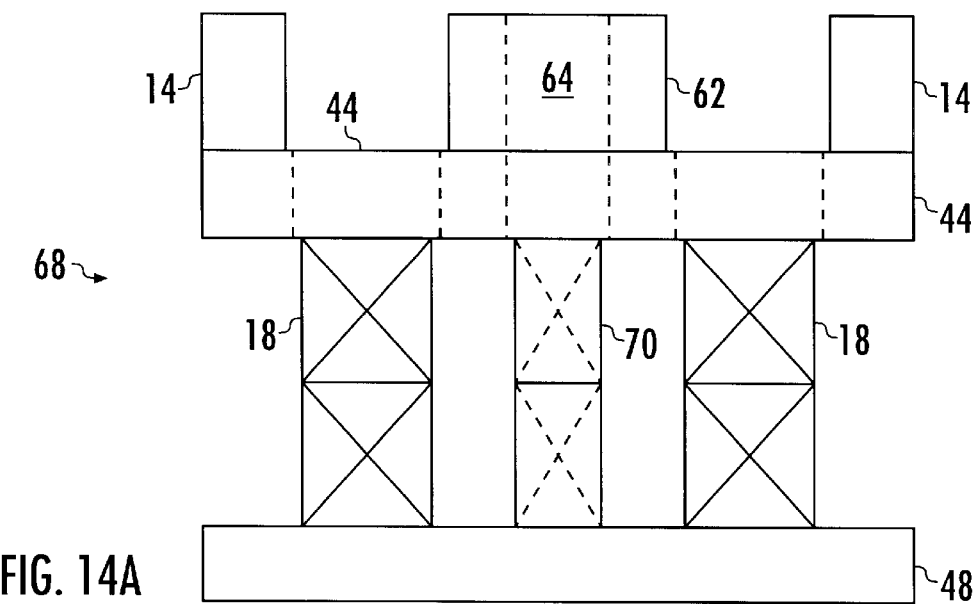

FIGS. 14A–14C illustrate a seventh embodiment of the platform, generally designated 68, of this invention. Platform 68 is similar to platform 60 of FIGS. 13A–31B.

However, here there is only one heave pontoon 48 which extends the entire length of platform 68. In addition, walled trusses 70 extend up from heave pontoon 48 into moon pools 64 when heave pontoon 48 is in its raised position. Trusses 70 are walled to protect risers passing through moon pools 64. Platform 68 may be installed as described above for platform 42 (FIGS. 10A–10C) or for platform 58 (FIGS. 12A–12B).

Figure 15C:
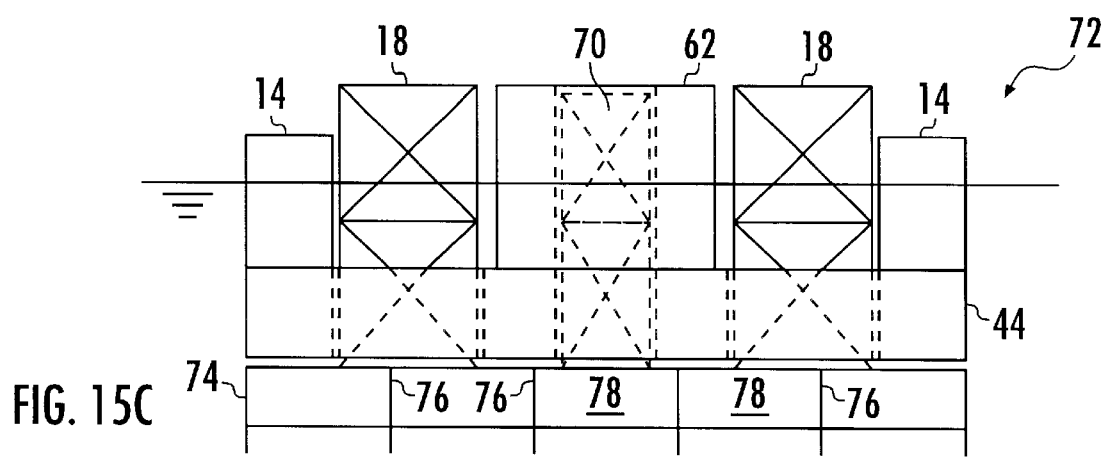
FIGS. 15A, 15B, and 15C illustrate an eighth embodiment of the platform of the invention.
Figure 15B:
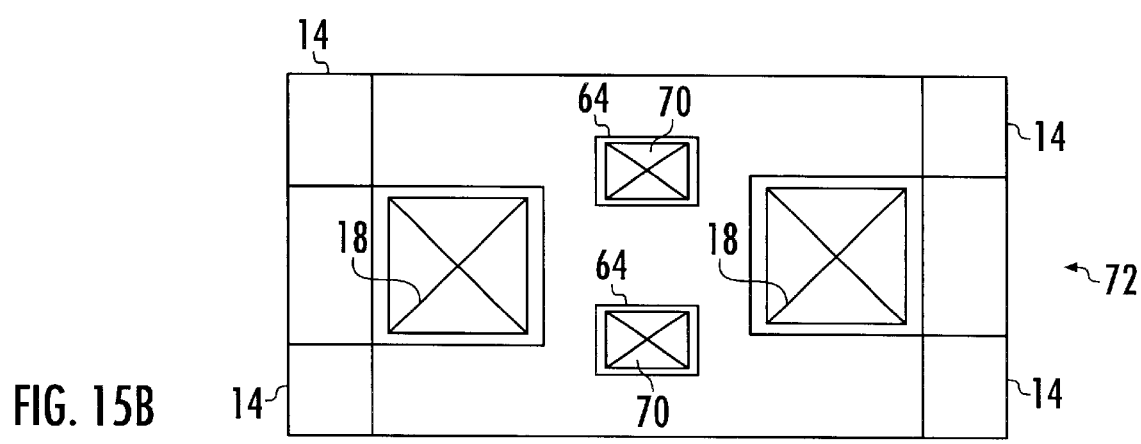
Figure 15A:
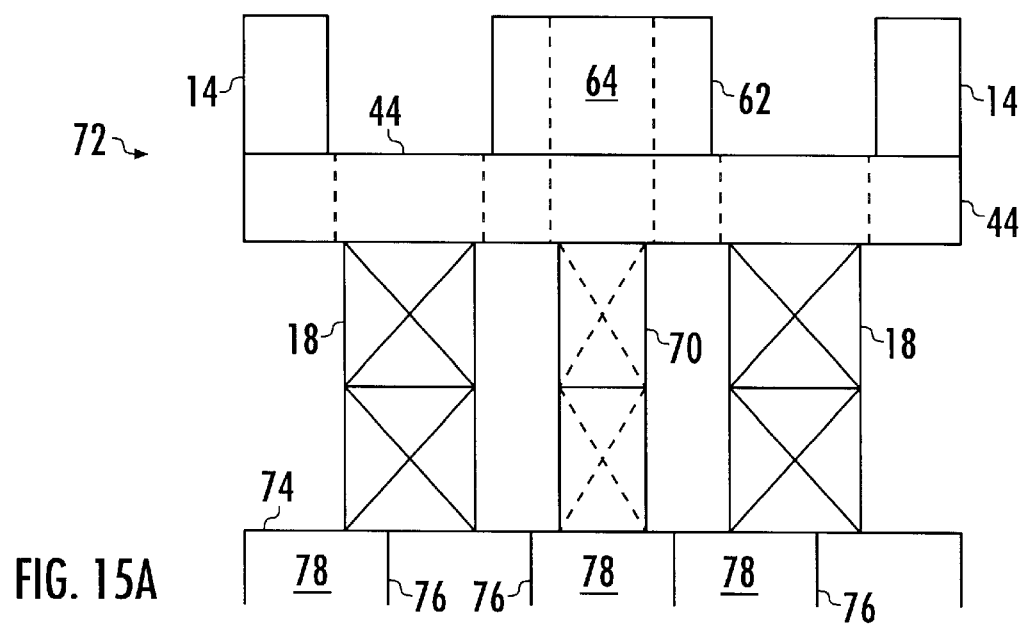

FIGS. 15A–15C illustrate an eighth embodiment of the platform, generally designated 72, of this invention. Platform 72 is substantially like platform 68 of FIGS. 14A–14C, except that heave pontoon 48 had been replaced by an inverted open barge 74 as described above with reference to platform 35 and FIGS. 8–9. Partitions 76 subdivide inverted open barge into open compartments 78. Platform 72 may be installed as described above with reference to platform 35 (FIGS. 8–9).

In addition to the foregoing discussed advantages, the present invention has additional advantages over prior art platforms. In prior telescoping truss platform designs, the truss structure penetrates the platform deck when the truss is in its raised position, and or requires connecting means located on the platform deck. In embodiments two through eight of the invention, the movable truss is, at all times, located entirely below the deck. Also, in all the embodiments of the invention, the lowered or deployed truss structure connects to the bottom of the floating platform, without a need for any connecting equipment to be located on the platform deck. This allows full use of the space on the deck for well drilling or producing equipment or storage facilities.

The heave suppressed, floating offshore drilling and production platform of the present invention, and many of its intended advantages, will be understood from the foregoing description of example embodiments, and it will be apparent that, although the invention and its advantages have been described in detail, various changes, substitutions, and alterations may be made in the manner, procedure, and details thereof without departing from the spirit and scope of the invention, as defined by the appended claims, or sacrificing any of its material advantages, the form hereinbefore described being merely exemplary embodiments thereof.

We claim:

1. A floating offshore drilling and production platform, which comprises:
    a deck for drilling and production operations;
    a plurality of buoyant columns extending from the lower side of the deck,
    means for connecting the adjacent columns near their lower ends;
    at least one vertically movable truss loosely fitted to the columns, wherein the at least one movable truss can be lowered with respect to the columns; and
    means attached to the bottom of the at least one movable truss for suppressing heave and vertical motions of the platform when said suppressing means is lowered by the at least one movable truss to a position substantially below the water surface.

2. The platform of claim 1, wherein the means for suppressing heave and vertical motions of the platform comprises an open barge attached to the bottom of the at least one movable truss.

3. The platform of claim 1, wherein the means for suppressing heave and vertical motions of the platform comprises an inverted open barge attached to the bottom of the at least one movable truss.

4. The platform of claim 3, wherein the inverted open barge includes vertical partitions therein for subdividing the open barge into a plurality of open compartments.

5. The platform of claim 1, wherein the means for suppressing heave and vertical motions of the platform comprises a heave pontoon attached to the bottom of the at least one movable truss.

6. The platform of claim 1, wherein at least a portion of the movable truss surrounds the columns when it is in its raised position.

7. The platform of claim 1, wherein the means for connecting the adjacent columns near their lower ends comprises hull pontoons extending between and fastened to the adjacent columns.

8. The platform of claim 7, wherein the at least one movable truss is surrounded by at least some of the hull pontoons and the columns when in its raised position.

9. The platform of claim 1, wherein the means for connecting the adjacent columns near their lower ends comprises a base truss extending between and fastened to the adjacent columns.

10. The platform of claim 9, wherein the base trusses are interconnected by diagonal members to resist wave loads acting on the platform from various directions.

11. The platform of claim 9, wherein at least a portion of the movable truss is surrounded by the base trusses and the columns when in its raised position.

12. The platform of claim 11, wherein the portion of the movable truss surrounded by the base trusses and the columns when in its raised position comprises an inner truss tower adjacent each of the columns.

13. The platform of claim 12, wherein the base truss includes members surrounding each of the inner truss towers for guiding the inner truss towers as they are lowered with respect to the columns.

14. The platform of claim 1, further including means for retaining the at least one movable truss in its lowered position with respect to the columns.

15. The platform of claim 14, wherein the at least one movable truss includes a vertical chord adjacent each of the columns, and wherein the means for retaining the movable truss in its lowered position with respect to the columns comprises:
    a first wedge block attached to the lower portions of at least some of the columns, the first wedge blocks facing the adjacent chord of the movable truss;
    for the first wedge block, a second wedge block attached to the chord at a position adjacent and facing the first wedge block; and
    a wedge disposed between and secured to the first and second wedge blocks.

16. The platform of claim 1, wherein one of the buoyant columns is a center column having at least one moon pool therein, and further including, for the at least one moon pool:
    a vertically movable truss loosely fitted within the moon pool, wherein the movable truss may be lowered out of the moon pool; and
    wherein said vertically movable truss loosely fitted within the moon pool is attached to the suppressing means.

17. The platform of claim 16, further including walls associated with the vertically movable truss that is fitted within the moon pool, for protecting risers passing through the movable truss from environmental loads.

18. A method for installing, at a deep water offshore drilling and production site, a heave suppressed, floating platform having a deck and columns extending from the lower side of the deck, which comprises:

placing a heave pontoon affixed to the bottom of a truss at a convenient place on the sea floor;

launching the platform offshore;

floating the platform to a position above the heave pontoon and truss on the sea floor;

lifting the truss and heave pontoon from the sea floor to the platform, so that the upper portion of the truss adjoins the lower portion of the platform; and securing the upper portion of the truss to the platform, whereby the heave pontoon suppresses heave and vertical motions of the platform.

19. The method of claim 18, further including the step of flooding at least one hull pontoon associated with the platform for further sinking the lower portion of the platform so that the deck is at the desired elevation above the sea surface.

20. A method for installing, at a deep water offshore drilling and production site, a heave suppressed, floating platform having a deck and columns extending from the lower side of the deck, which comprises:

launching the platform offshore into relatively shallow water;

floating the platform to the deep water drilling and production site;

flooding a hollow structure affixed to the bottom of a vertically movable truss loosely fitted to the columns for further sinking the lower portion of the platform; and lowering the structure to a position substantially below the bottom of the platform by lowering the movable truss with respect to the platform so that the hydrodynamic mass of the structure suppresses heave and vertical motions of the platform.

21. The method of claim 20, wherein the hollow structure comprises an open barge.

22. The method of claim 20, wherein the hollow structure comprises an inverted barge, and wherein the inverted barge is flooded by releasing air therefrom.

23. The method of claim 22, wherein the inverted barge is subdivided into a plurality of open compartments by vertical partitions therein, and wherein the air is released from the inverted barge by venting the compartments to the atmosphere.

24. The method of claim 20, wherein the hollow structure comprises a heave pontoon.

25. The method of claim 24, further including the step of flooding at least one hull pontoon associated with the platform for further sinking the lower portion of the platform so that the deck is at the desired elevation above the sea surface.

26. The method of claim 20, wherein the movable truss and hollow structure are lowered by operating at least one winch to lower the movable truss by a cable connected thereto.

27. The method of claim 20, further including the step, after the step of lowering the movable truss with respect to the platform, of securing the upper end of the movable truss to the platform.

* * * * *

UNITED STATES PATENT AND TRADEMARK OFFICE
CERTIFICATE OF CORRECTION

PATENT NO.    : 6,652,192 B1
DATED         : November 25, 2003
INVENTOR(S)   : Qi Xu, Phillip A. Abbott and John Halkyard It is certified that error appears in the above-identified patent and that said Letters Patent is hereby corrected as shown below:

Title page,
Item [57], ABSTRACT,
Line 4, the word "bottom" should read as -- bottoms --.
Line 6, the word "end" should read as -- ends --.
Line 7, the word "enchance" should read as -- enhance --.
Line 7, the word "intergrity" should read as -- integrity --.

Column 1,
Line 28, the phrase "drilling production" should read as -- drilling/production --.
Line 42, the phrase "oil gas" should read as -- oil/gas --.
Line 65, the phrase "(Tension Leg Platform" should read
as -- (Tension Leg Platform) --.

Column 2,
Line 8, the phrase "fabrication installation" should read as -- fabrication/installation --.

Column 5,
Line 59, the phrase "and or" should read -- and/or --.

Column 6,
Line 13, the phrase "deck load displacement" should read
as -- deck load/displacement --.
Line 64, the phrase "surge sway" should read as -- surge/sway --.
Line 65, the phrase "pitch roll" should read as -- pitch/roll --.

Column 7,
Line 25, the phrase "and or" should read as -- and/or --.
Line 32, the phrase "$0.1457\pi$" should read as -- $0.145\pi$ --.

Column 8,
Line 20, the phrase "and or" should read as -- and/or --.

Column 9,
Line 64, the phrase "FIG. 1 OA" should read as -- FIG. 1 ØA --.

Column 10,
Line 67, the phrase "FIGS. 13A-31B" should read as -- FIGS. 13A-13B --.

UNITED STATES PATENT AND TRADEMARK OFFICE
CERTIFICATE OF CORRECTION

PATENT NO.   : 6,652,192 B1
DATED        : November 25, 2003
INVENTOR(S)  : Qi Xu, Phillip A. Abbott and John Halkyard It is certified that error appears in the above-identified patent and that said Letters Patent is hereby corrected as shown below:

Column 11,
Line 22, the phrase "and or" should read as -- and/or --.

Signed and Sealed this

Third Day of August, 2004

JON W. DUDAS
*Acting Director of the United States Patent and Trademark Office*